United States Patent [19]

Dubesset et al.

[11] Patent Number: 4,881,207

[45] Date of Patent: Nov. 14, 1989

[54] SEISMIC PROSPECTION METHOD PROVIDING IMPROVED KNOWLEDGE OF THE GEOLOGICAL DISCONTINUITIES OF THE SUBSOIL

[75] Inventors: Michel Dubesset, Bazemont; Christian Cliet, Rueil-Malmaison, both of France

[73] Assignee: Insitut Francais du Petrole, Rueil-Malmaison, France

[21] Appl. No.: 190,152

[22] Filed: May 4, 1988

[30] Foreign Application Priority Data

May 7, 1987 [FR] France .................................. 87 06544

[51] Int. Cl.$^4$ .......................... G01V 1/40; G01V 1/30
[52] U.S. Cl. ......................................... 367/31; 367/30; 367/72; 364/422
[58] Field of Search ....................... 367/30, 31, 24, 72, 367/73; 364/422

[56] References Cited

U.S. PATENT DOCUMENTS

| 2,089,983 | 8/1937 | Ricker | 367/73 |
| 4,300,220 | 11/1981 | Goff et al. | 367/188 |
| 4,783,744 | 11/1988 | Yueh | 364/422 |

FOREIGN PATENT DOCUMENTS

| 1559153 | 3/1969 | France | 367/30 |
| 1602303 | 11/1970 | France | 367/30 |

OTHER PUBLICATIONS

Benhama et al., "Study and Application ... Recordings", 47 for Europ. Ass. Exp. Geophys. Mtg., 6/85, Budapest, Hungary.

Dubesset et al., "First Results ... Recording", 6/11/82, 44 for Europ. Ass. Explor. Geophs. Mtg., PAP 34–35, Cannes., France.

Cliet et al., "Three Component Recordings ... Study", 12/6/84, 54th Ann. Soc. Explor. Geophys. Int. Mtg., Atlanta, Georgia.

Cliet, et al., "Three Component and Velocity Analysis", 6/6/86, 48 for Europ. Ass. Explor. Geophys. Mtg., Oostende, Belg.

Primary Examiner—Nelson Moskowitz
Attorney, Agent, or Firm—Antonelli, Terry & Wands

[57] ABSTRACT

A seismic prospection method is provided giving better knowledge of the position and of the nature of the geological discontinuities of the subsoil, consisting essentially in picking up seismic waves which are propagated in the ground by means of one or more seismic receivers each having three directional sensors oriented along three orthogonal axes and determining, by combining the signals delivered by the sensors of each receiver, the real position in space and the form of the trajectory described by the center of gravity of each receiver, in response to the waves received, in recording the variations of these different parameters as a function of the distance from the receivers to the transmission location and locating the reception positions where significant variations of these parameters occur.

8 Claims, 4 Drawing Sheets

4,881,207

SEISMIC PROSPECTION METHOD PROVIDING IMPROVED KNOWLEDGE OF THE GEOLOGICAL DISCONTINUITIES OF THE SUBSOIL

BACKGROUND OF THE INVENTION

1. Field of the Invention

The invention relates to a seismic prospection method providing better knowledge of the position and of the nature of the geological discontinuities of the subsoil.

2. Description of the Prior Art

Seismic prospection methods generally include a step for transmitting seismic waves, a step for receiving at one or more positions waves which are propagated in the ground to be studies, a step for recording the signals received and a step for applying to the recorded signals processing operations of very different kinds before drawing up seismic sections in which the discontinuities of the subsoil are restored in their true place.

A known seismic prospection method includes the transmission of seismic waves from a source disposed either at the surface of the ground or in another well and the reception of the waves after propagation at one or more positions in a well bored in the ground.

The reception is provided by means of a reception device having at least one probe of small section, suspended by an electric suspension cable from a support assembly disposed on the surface, and having retractable anchorage arms for applying the body of the probe against the wall of the well. In a compartment of the probe body are disposed one or more directional seismic sensors.

These sensors are generally associated in threes and their axes disposed along three orthogonal axes.

The reception device may include also several well probes suspended below each other and each containing at least one triaxial sensor, so as to increase the positions for receiving the seismic waves. The probe or the probe assembly is lowered into the well and raised in successive steps. At each pause, a cycle of seismic wave transmission is carried out.

The waves which are propagated as far as the probe or the probe assembly are received by the triaxial sensors and the seismic signals are collected by an acquisition assembly which transmits them to a surface laboratory.

Such well probes are described for example in the French Pat. Nos. 2 501 380 and 2 548 727 and the French patent applications EN 87/04365 and 87/04677.

The signals received are generally complex. Geophysicists have sought to determine the curve described by the center of gravity of each triaxial receiver and designated hereafter by trajectory, from the signals received by the three elementary sensors of the same receiver and have discovered that the surface which was best able to represent it, at least for a certain time from the beginning of reception, was an ellipsoid generally very flattened.

It has been considered up to now that this flattened ellipsoid modeling the real trajectory was contained in a substantially vertical plane, the deviations being neglected, and that this vertical plane was the one which passed through the seismic source and the position of each receiver.

Since the probe or each of them is able to rotate to a greater or lesser degree about its axis during the lowering or raising operations, the trihedron formed of the respective axes of the three elementary sensors of each receiver may have any orientation with respect to the vertical plane passing through the source and the reception position. On this assumption, it was neessary to compare and combine the signals delivered by the sensors of the same receiver so as to determine the dihedral angle of the vertical plane of the trajectory with a vertical reference plane formed by two axes of the trihedron and the angle between the axes of symmetry of the trajectory and the horizontal plane. These two angles which, by analogy may be designated by longitude and latitude, were sufficient for characterizing the position of the trajectory. The knowledge of these two angles and of other parameters such as the ellipticity of the trajectory made it possible, on this assumption, to determine certain geophysical and geological characteristics of the ground passed through by the waves.

The seismic prospection method of the invention improves very appreciably the knowledge of the geological characteristics of the ground passed through.

SUMMARY OF THE INVENTION

It includes the transmission of acoustic waves into the ground, the reception of the acoustic waves which are propagated in the ground by means of at least one seismic triaxial receiver and recording of the waves received. It is characterized in that it includes the determination, from the different signals delivered by each receiver, of parameters defining the real position in space and the form of the trajectory followed by the center of gravity of each receiver, in response to the waves received, the determination, as a function of the distance between each receiver and the transmission location, of the variations of each of said parameters and the localization of the geological discontinuities at depths at which significant variations of said parameters are measured.

Since the model of the trajectory is an "equivalent ellipsoid", the waves received by the three sensors of the receiver are combined for example so as to determine its position in space and parameters indicative of its form, and the curves are established representative of the variations of the different parameters as a function of the distance between each receiver and the transmission location of the seismic waves.

Each receiver is for example applied against the wall of a borehole and the transmission location is situated at the ground surface. In this case, its distance to the transmission location is substantially its depth, and it is a function thereof that the different parameters are represented.

BRIEF DESCRIPTION OF THE DRAWINGS

Other features and advantages of the method will be clear from reading the description of one embodiment given by way of non limitative example, with reference to the accompanying drawings in which.

DESCRIPTION OF THE PREFERRED EMBODIMENT

Figure 1:
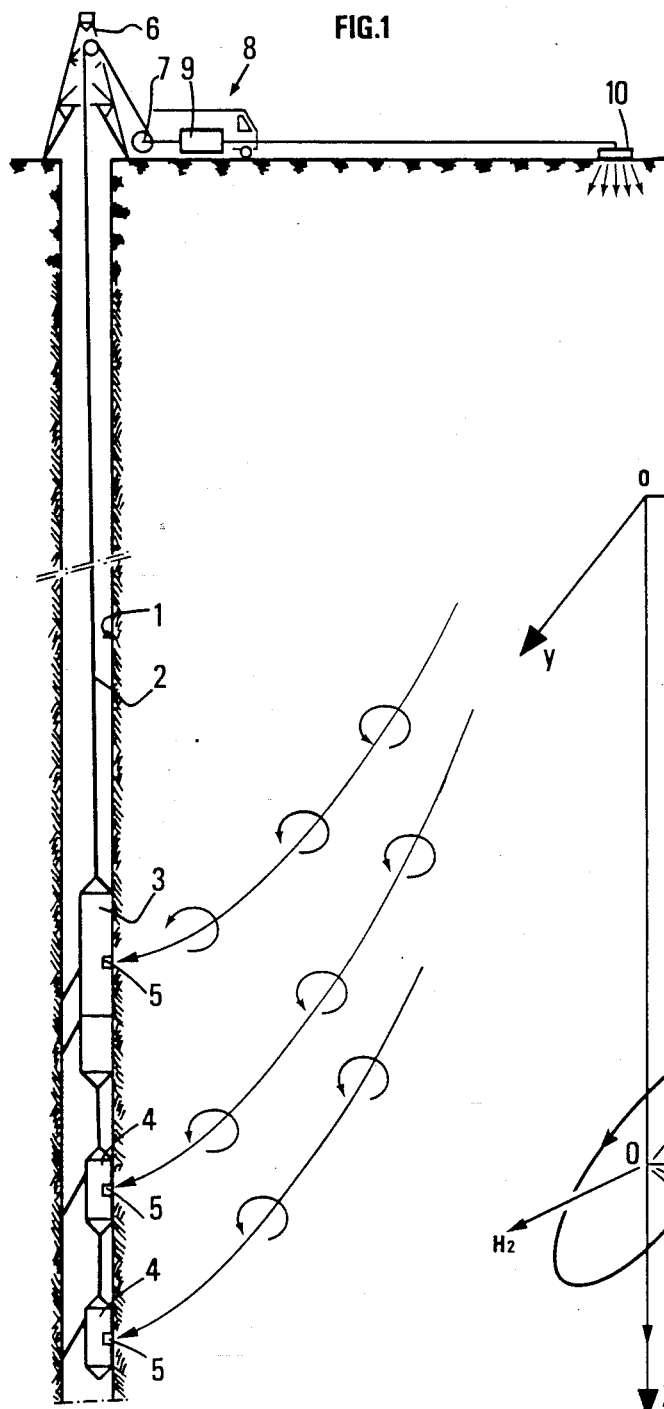
FIG. 1 shows a reception assembly with several probes, lowered into a borehole.

Operations for the seismic prospection of the subsoil may be carried out by lowering into a well 1 (FIG. 1), at the end of a multifunction electric suspension cable 2, a reception device including a single probe 3 under which satellite probes 4 may be suspended.

In each of the probes is disposed at least one seismic receiver 5 comprising at least one directional sensor. It generally uses triaxial receivers including three directional sensors whose axes are directed in three directions orthogonal to each other and form a trirectangular trihedron. The probes are provided with anchorage arms and may be immobilized in the borehole at any depth where seismic recordings are to be made. The electric suspension cable 2 connects probe 3 or the probe assembly 3, 4 to a surface unit including a support structure 6 and a winch 7 disposed on a vehicle 8. The signals picked up by each receiver are transmitted by electric conductors of the cable to a central control and recording system 9 disposed on the vehicle. The connection is direct if the number of receivers is small. It is provided in another case through a data acquisition apparatus disposed in one of the probes and adapted for collecting, digitizing and coding the seismic signals to be transmitted. Such reception assemblies for drilling are described in the above French patent applications or patent.

With the probe or probe assembly applied against the wall of the borehole at a chosen depth, a seismic source 10 is actuated in contact with the ground and the waves which are propagated as far as the different receivers are recorded.

The movement of the particles of earth in the wall of the borehole against which the seismic receivers are applied is generally very complex.

Figure 2:
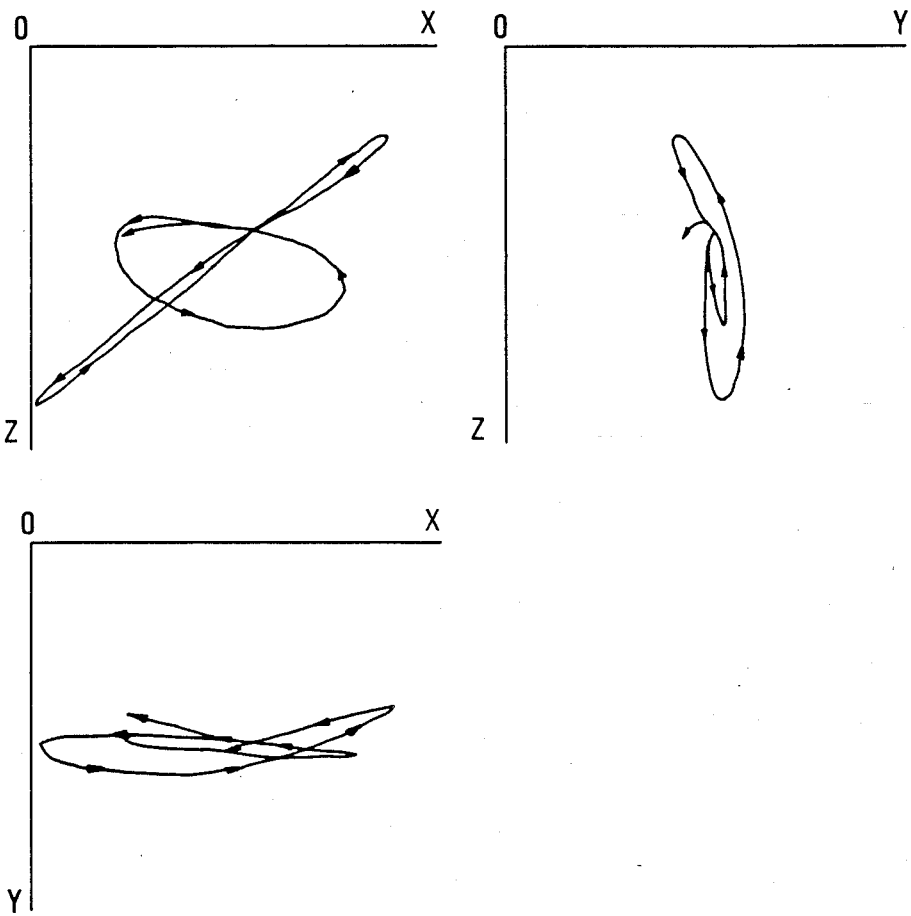
FIG. 2 shows the projections on three orthogonal planes of a trajectory having a privileged polarization in a vertical plane, for a limited time interval.

The movement of the center of gravity of each triaxial seismic receiver may be represented as shown in FIG. 2, by its projection on three orthogonal planes, the vertical plane XOZ containing the location of a seismic receiver and that of the seismic source 10, the vertical plane YOZ perpendicular to the preceding one and the horizontal XOY. This movement of the center of gravity wil be designated hereafter by trajectory. If the time for recording the signals is limited, the trajectory described may be represented more simply by a curve in space which, with good approximation, may be considered as a very flattened ellipsoid. It can be seen in FIG. 3 that the projection of the trajectory on plane XOZ is substantially an ellipsis whereas the projections on the two planes orthogonal to the first one (YOZ and XOY) are practically reduced to straight line segments.

Figure 4:
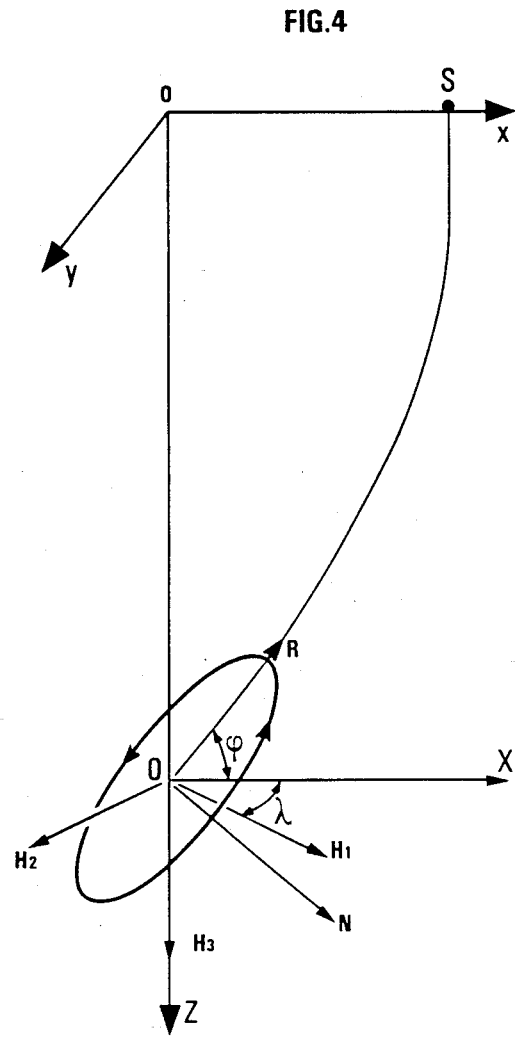
FIG. 4 represents the path of the center of gravity of the three sensors of the same triaxial receiver under the action of the seismic waves picked up, polarized in a vertical plane, where $\phi$ represents the latitude and $\lambda$ the longitude, FIG. 5 also shows projections on three orthogonal planes of a trajectory recorded during a limited time interval and illustrates the general case where the polarization plane of the trajectory is oriented anyhow in space.

Use of the recordings obtained has been made up to now on the assumption that the substantially flat ellipsoid travelled over by the trajectory was contained in a vertical plane and that this plane passed through the reception location and that of the seismic source S (10). Because of the twisting of the electric suspension cable during the raising operations, the position of the trihedron ($H_1$, $H_2$, $H_3$) formed by the axes of the sensors of a triaxial receiver (FIG. 4) may be any whatsoever. Since axis $H_3$ may be considered as always vertical, the indetermination relates in fact to the position of the reference ($H_1$, $H_2$). On the current assumption that the trajectory was considered as substantially contained in the vertical plane XOZ passing through the transmission point S (FIG. 4) a single angle $\lambda$ which corresponds by an analogy to a longitude was sufficient for characterizing the polarization plane of the trajectory.

The processing of the seismic data read from the recordings consisted in this case in combining the three signals from each receiver so as to calculate the angle $\lambda$ and also the angle $\phi$, analogous to a latitude, representing the inclination of the large axis of the ellipsis with respect to the horizontal.

By a more realistic consideration of the complexity of the trajectories detected, the method of the invention makes it possible to measure all along the borehole a larger number of parameters generally representing lithological and geological variations of the different layers passed through and so to obtain a more detailed representation of the subsoil.

Figure 3:
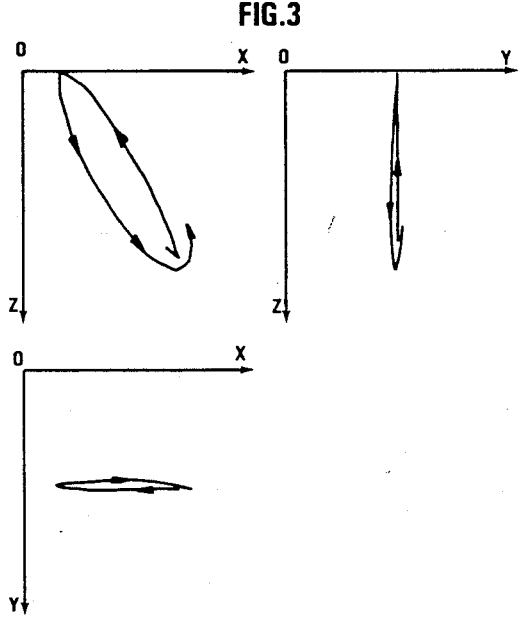
FIG. 3 shows projections on three orthogonal planes of a trajectory recorded during a limited time interval.
Figure 5:
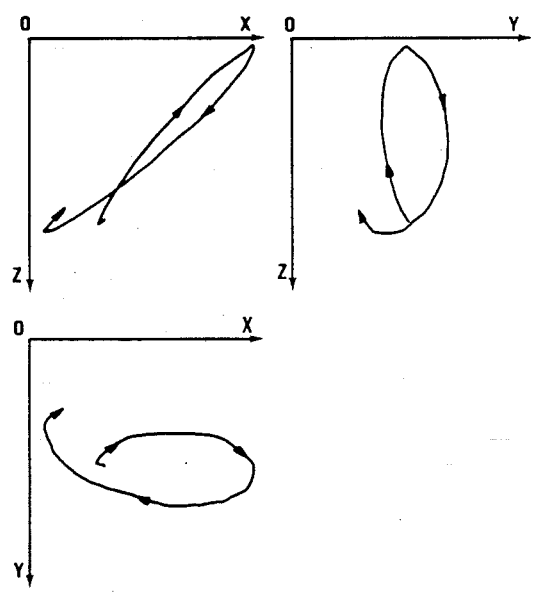

FIG. 5 in fact shows that the trajectory is not projected in a privileged way in the plane XOZ as in the case shown in FIG. 3 but in the two complementary planes YOZ and XOY and that it is the projection in the plane XOY which is here reduced almost to a segment. It can be readily checked by forming and examining a stereoscopic pair of the trajectory which shows that the mean plane is no longer vertical. This is explained by the fact that in most cases the privileged polarization plane of the trajectory is not situated in the vertical plane passing through each receiver and the transmission location 10 but that it has a certain obliqueness with respect to the vertical.

Figure 6:
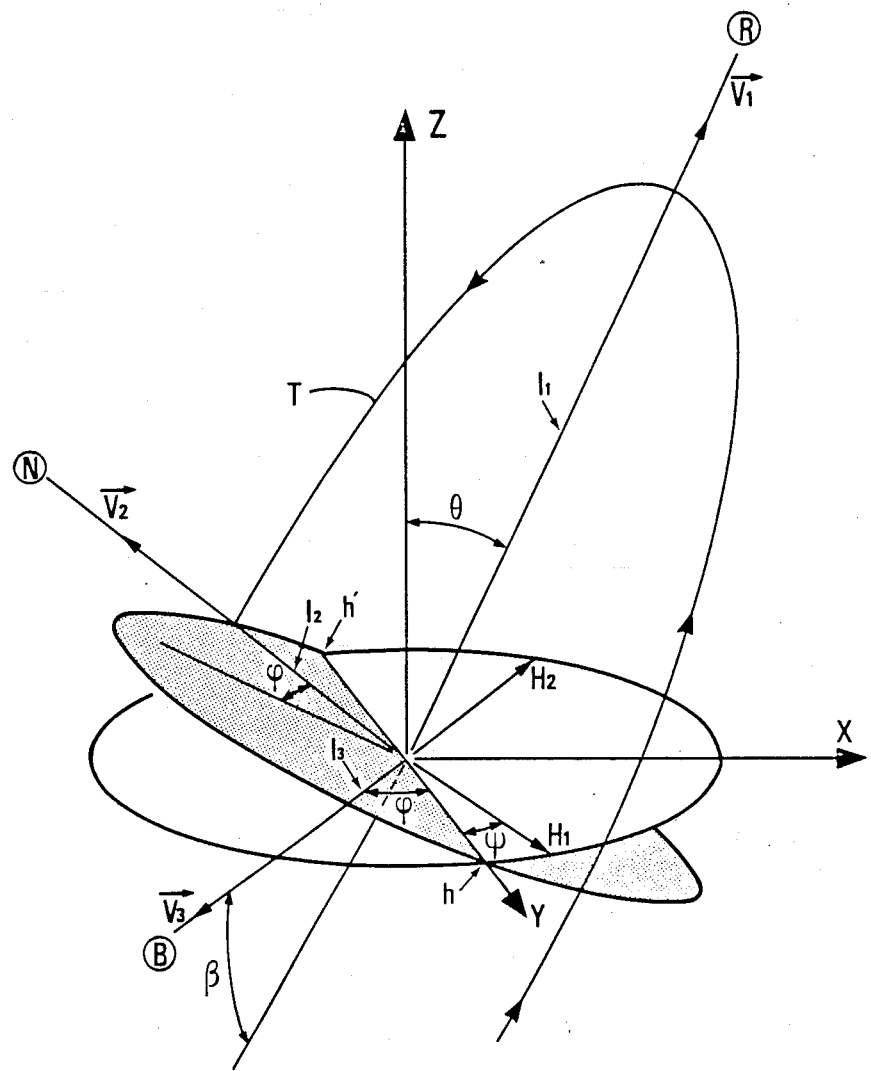
FIG. 6 shows any trajectory in space and its representative parameters.

The ellipsoid T best representing the trajectory observed must then be defined by a larger number of parameters, as shown in FIG. 6. V1 designates the main polarization axis of the ellipsoid; V2 its second axis orthogonal to the first one and V3 its third axis perpendicular to the plane formed by the two preceding ones. To define the position of these three axes, the Euler angles may for example be used. The so called nutation angle $\theta$ is the one which the main axis V1 forms with the vertical OZ. The plane normal to the main axis V1 intersects the horizontal plane along a line hh' which forms an angle $\psi$ called precession angle, with the axis $H_1$ of one of the two horizontal sensors of each triaxial seismic receiver. This same line hh' forms with the third axis V3 an angle $\phi$ called proper rotation. Thus a fourth angle $\beta$ is defined called lateral inclination. This is the angle which the third vector V3 forms with the horizontal plane.

A trajectory portion is defined by a certain number n of signal samples with three components. From the values of the signals recorded by the three sensors of the same triaxial receiver and by a transformation method known per se, the covariant matrix of the samples is calculated over a given time interval and three proper values $L_1$, $L_2$, $L_3$ are obtained and the three proper vectors V1, V2, V3 each defined by three directrix cosines, with respect to the three axes $H_1$, $H_2$, Z of the trihedron relates to each seismic sensor. The directrix cosines $V^{H1i}$, and $V^{zi}$ correspond to the proper vector Vi (i=1, 2 or 3). The square roots of the three proper values previously determined may then be calculated, which roots represent the lengths a, b and c of the three half axes of the equivalent ellipsoid, except for a constant coefficient.

The values of the four previously defined angles are then calculated by the following formulae:

$\theta = \cos^{-1}(V^{z1})$ $\psi = \tan^{-1}(V^{H11}/-V^{H21})$ $\phi = \tan^{-1}(V^{z3}/V^{z2})$ $\beta = \sin^{-1}(V^{z3})$ Thus other polarizatiion parameters are determined such as the coefficients of ellipticity $e_{21}$, $e_{31}$, $e_{32}$ by working out the ratio between the values of the three previously calculated half axes a, b, c or else a flatness coefficient p by combining the values of the three half axes a, b, c.

With the values of the different parameters calculated for each triaxial seismic receiver, their representative curves can be determined as a function of the reception depth and recordings thereof made.

Reading of these parameter recordings greatly facilitates the interpretation of the seismic recordings to the extent that a manifest correlation exists between the depths at which geological discontinuity zones are situated and those at which appreciable variations are observed in the representative curves of the parameters. It may be in particular noted:

that an increase of the main ellipticity $e_{21}$ of the ellipsoid goes hand in hand with an increased attenuation; and that a decrease of the nutation angle $\theta$ is associated with a local decrease if the propagation speed of the seismic waves.

Considering the curves of variation of the parameters, the position of the horizons may then be clearly indicated on the seismic recordings. In the example considered, the triaxial receivers are disposed in a borehole.

It goes without saying that the method of the invention could be applied by disposing the receivers on the surface.

What is claimed is:

1. A seismic prospection method for identifying the position and nature of geological discontinuities of the subsoil, including the steps of:

transmitting the acoustic waves into the ground;
   receiving the acoustic waves which are propagated in the ground by means of a plurality of seismic triaxial receivers each having three sensors and recording the waves received;
   determining, from the different signals delivered by each said receiver, parameters defining the real position in space and the form of the ellipsoid modeling displacement of the center of gravity of each said receiver, in response to the waves received;
   determining the variations of each of said parameters, as a function of the distance between each receiver and the transmission location; and
   localizing geological discontinuities at depths where sensible concomitant variations of said parameters are measured.

2. The method as claimed in claim 1 further comprising plotting curves representatives of the variations of the different parameters as a function of the distance between each receiver and the transmission location of the seismic waves.

3. The method as claimed in claim 2 wherein each said receiver is mounted against the wall of a borehole and the transmission location is situated at the ground surface, said distance between each said receiver and the transmission location being substantially the depth of the receiver.

4. The method ad claimed in claim 2 wherein the receivers are coupled with the ground on the ground surface, said distance being offset laterally.

5. The method as claimed in claim 1 wherein a trajectory is defined by a cluster of n points determined by:
   taking n samples from the signals delivered respectively by three sensors of each triaxial receiver;
   calculating three component samples of a covariance matrix so as to determine the eigenvalues and eigenvectors defined by their respective direction cosines; and
   determining the angles defining the real position in space of the said ellipsoid modeling the trajectory and of the parameters indicative of its form by combining the eigenvalues and the directrix cosines.

6. The method as claimed in claim 5 further comprising:
   determining the coefficients defining the ellipticity and the flatness of the trajectory;
   determining variations of said coefficients as a function of the distance between the transmission location and the position of each receiver whereby geological discontinuities are located for values of the distance where significant variations of the values of said coefficients are observed.

7. The method as claimed in claim 1 wherein each said receiver is mounted against the wall of a borehole and the transmission location is situated at the ground surface, said distance between each said receiver and the transmission location being substantially the depth of the receiver.

8. The method ad claimed in claim 1 wherein the receivers are coupled with the ground on the ground surface, said distance being offset laterally.

* * * * *